(12) United States Patent
Mizoguchi et al.

(10) Patent No.: US 10,880,441 B2
(45) Date of Patent: Dec. 29, 2020

(54) IMAGE READING APPARATUS AND SHADING CORRECTION METHOD FOR SWITCHING SHADING CORRECTION BASED ON EXTERNAL LIGHT

(71) Applicant: SEIKO EPSON CORPORATION, Tokyo (JP)

(72) Inventors: Masahiko Mizoguchi, Fukuoka (JP); Daisuke Honda, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/590,507

(22) Filed: Oct. 2, 2019

(65) Prior Publication Data
US 2020/0112643 A1 Apr. 9, 2020

(30) Foreign Application Priority Data
Oct. 4, 2018 (JP) .................................. 2018-188879

(51) Int. Cl.
*H04N 1/00* (2006.01)
*H04N 1/407* (2006.01)

(52) U.S. Cl.
CPC ..... *H04N 1/00082* (2013.01); *H04N 1/00013* (2013.01); *H04N 1/00018* (2013.01); *H04N 1/00034* (2013.01); *H04N 1/00068* (2013.01); *H04N 1/00835* (2013.01); *H04N 1/00997* (2013.01); *H04N 1/4076* (2013.01)

(58) Field of Classification Search
CPC ........... H04N 1/00013; H04N 1/00018; H04N 1/00034; H04N 1/0005; H04N 1/00068; H04N 1/00082; H04N 1/00835; H04N 1/00997; H04N 1/40025; H04N 1/4005; H04N 1/407; H04N 1/4076; H04N 1/4078; H04N 1/6027
See application file for complete search history.

(56) References Cited

U.S. PATENT DOCUMENTS

2006/0023267 A1* 2/2006 Ikeno ................. H04N 1/00997
358/474
2007/0285739 A1* 12/2007 Nakano ............... H04N 1/0005
358/474

(Continued)

FOREIGN PATENT DOCUMENTS

JP  2013-150175 A  8/2013
JP  2017-0199998 A  11/2017

*Primary Examiner* — Scott A Rogers
(74) *Attorney, Agent, or Firm* — Global IP Counselors, LLP

(57) ABSTRACT

The image reading apparatus includes a reading unit, a reading region in which a first region in which a member that suppresses entry of external light is disposed and a second region other than the first region are arranged in a main scanning direction of the reading unit, and a controller, wherein the controller calculates intensity of external light in the second region based on a reading value in the reading region, wherein the reading value is obtained by the reading unit, determines whether the intensity of the external light exceeds a threshold value, performs a first shading correction on a reading value of a document transported to the reading region when the intensity of the external light exceeds the threshold value, and performs a second shading correction on the reading value of the document when the intensity of the external light does not exceed the threshold value.

6 Claims, 4 Drawing Sheets

(56) References Cited

U.S. PATENT DOCUMENTS

| | | | |
|---|---|---|---|
| 2010/0134853 A1* | 6/2010 | Suzuki | H04N 1/0057 358/474 |
| 2017/0208209 A1* | 7/2017 | Sato | H04N 1/00034 |
| 2019/0281179 A1* | 9/2019 | Hosogoshi | H04N 1/00835 |
| 2020/0106892 A1* | 4/2020 | Honda | H04N 1/00063 |

* cited by examiner

IMAGE READING APPARATUS AND SHADING CORRECTION METHOD FOR SWITCHING SHADING CORRECTION BASED ON EXTERNAL LIGHT

The present application is based on, and claims priority from JP Application Serial Number 2018-188879, filed Oct. 4, 2018, the disclosure of which is hereby incorporated by reference herein in its entirety.

BACKGROUND

1. Technical Field

The present disclosure relates to an image reading apparatus and a shading correction method.

2. Related Art

JP-A-2017-199998 discloses a scanner which performs external light measurement to measure intensity of external light reaching the sensor with the light source turned off and determines whether the measurement result exceeds a threshold value, wherein when the result of the external light measurement does not exceed the threshold value, the latest shading measurement result is made to be the shading result to be used in the next scan, and when the result of the external light measurement exceeds the threshold value, the shading result when the past external light measurement result has not exceeded the threshold value is made to be the shading result to be used in the next scan.

The degree to which the scanner is affected by external light depends on the structure of the scanner. The correction process to be performed on a reading value of a document differs depending on the degree of the influence of the external light. As a result, it is necessary to appropriately determine the intensity of external light according to the structure of the device.

SUMMARY

An image reading apparatus includes a reading unit performing reading according to an amount of light received, a reading region in which a first region in which a member that suppresses entry of external light is disposed and a second region other than the first region are arranged in a main scanning direction of the reading unit, and a controller controlling the reading unit, wherein the controller calculates intensity of external light in the second region based on a reading value in the reading region wherein the reading value is obtained by the reading unit, determines whether the intensity of the external light exceeds a threshold value, performs a first shading correction on a reading value, obtained by the reading unit, of a document transported to the reading region when the intensity of the external light exceeds the threshold value, and performs a second shading correction different from the first shading correction on the reading value of the document when the intensity of the external light does not exceed the threshold value.

DESCRIPTION OF EXEMPLARY EMBODIMENTS

Hereinafter, embodiments of the present disclosure will be described with reference to the drawings. The drawings are only an example for describing the embodiments. Since the drawings are an illustration, they may not be in agreement with each other, or may be partially omitted.

Figure 1:
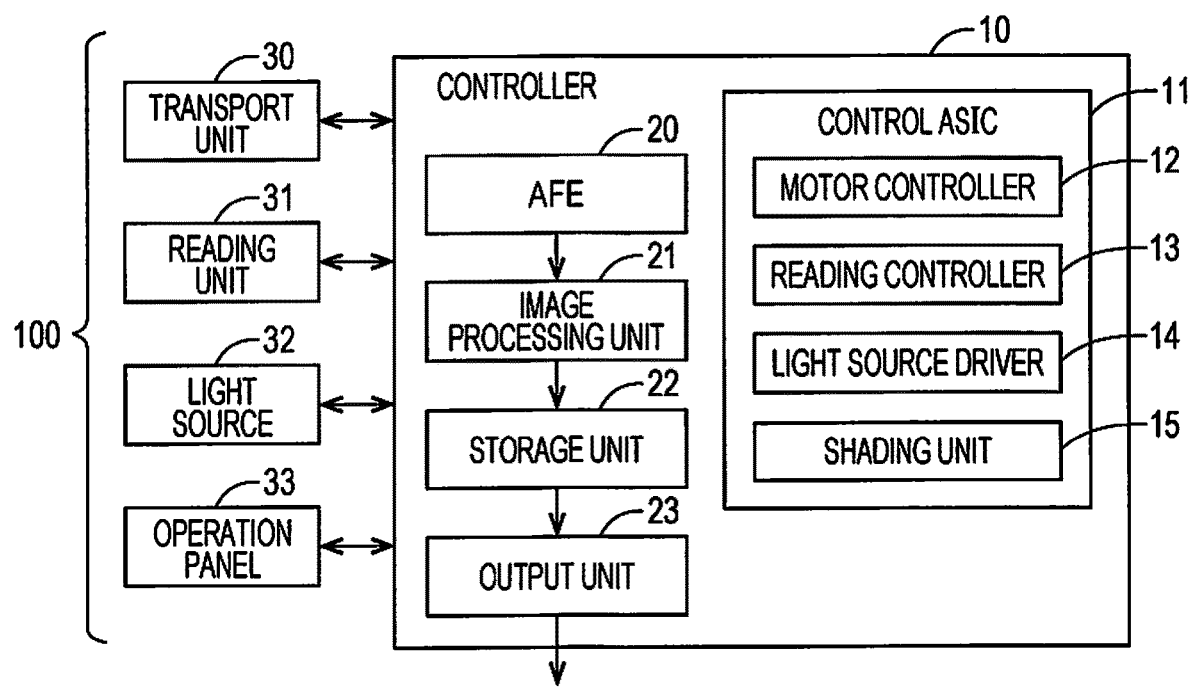
FIG. 1 is a block diagram schematically showing the configuration of an image reading apparatus.
Figure 2:
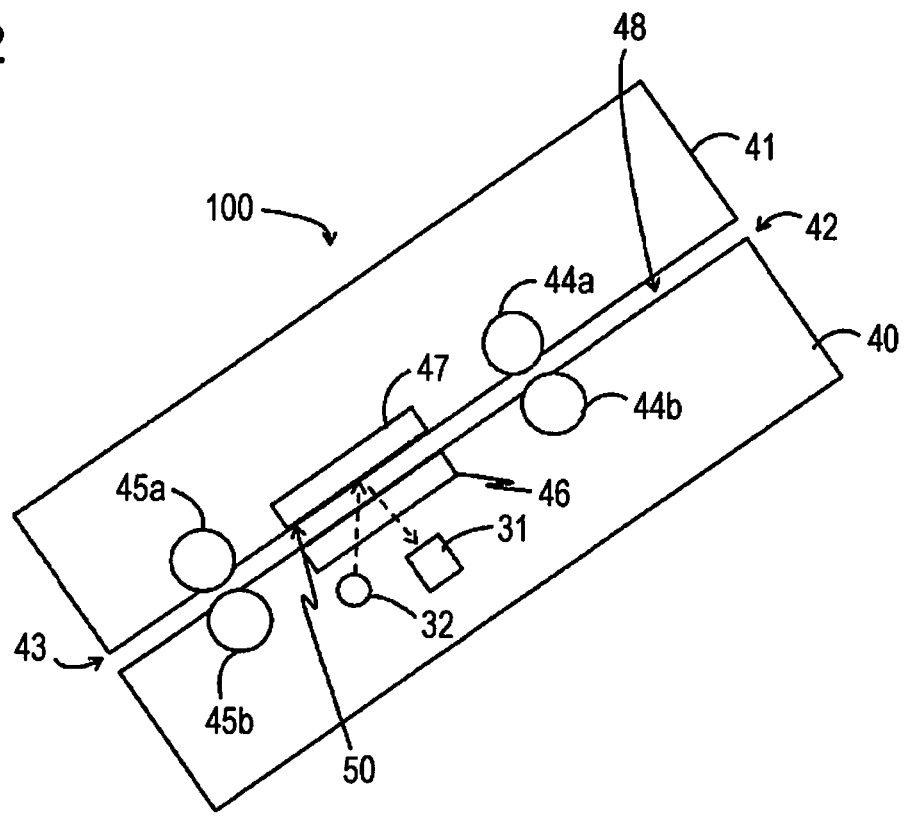
FIG. 2 is a schematic diagram showing a mechanical structure of the image reading apparatus including a transport path.

1. Schematic Configuration of Image Reading Apparatus:

FIG. 1 schematically shows the configuration of an image reading apparatus 100 according to the present embodiment. FIG. 2 schematically shows the mechanical structure of the image reading apparatus 100 including a transport path 48. The image reading apparatus 100 is a scanner capable of reading a document. The image reading apparatus 100 includes a transport unit 30 that transports a document, a reading unit 31 that performs reading, a light source 32 that irradiates an object to be read such as a document, an operation panel 33, and a controller 10 that controls the transport unit 30, the reading unit 31, the light source 32, and the operation panel 33. The operation panel 33 includes a display unit that displays visual information, an operation receiving unit that receives an operation from a user, and the like. Examples of the operation receiving unit include a touch panel implemented in the display unit, a physical button, and the like. The image reading apparatus 100 may be a multifunction machine having a plurality of functions such as a printer in addition to the function as a scanner.

The transport unit 30 is a mechanism for transporting the document from upstream to downstream of transport, and includes, for example, a roller that transports the document, a motor that rotates the roller, and the like. The document transported by the transport unit 30 is read by the reading unit 31. Therefore, the image reading apparatus 100 corresponds to a sheet feed scanner. The transport unit 30 may be referred to as an auto document feeder (ADF).

The light source 32 is, for example, a light emitting diode (LED). The reading unit 31 has an image sensor. The image sensor receives reflected light from a document or the like of light emitted by the light source 32, stores an electric charge according to the amount of light received, and transmits the electric charge to the controller 10 as image data. The image sensor is composed of a plurality of sensor chips arranged in the main scanning direction. The main scanning direction is a direction that intersects the transport direction of the document by the transport unit 30. The term "intersect" as used herein means orthogonality, but may mean not only strictly orthogonality, but also orthogonality with an error of a certain degree which is caused due to component mounting accuracy or the like. That is, the reading unit 31 is a line sensor having a length capable of covering the width of the document in the main scanning direction. In FIG. 2, the main scanning direction is a direction perpendicular to the plane of the paper of FIG. 2.

Respective sensor chips constituting the reading unit 31 have the configuration same as that of a contact image sensor (CIS) or a charge coupled device (CCD) image sensor. That is, each sensor chip includes a photoelectric conversion element, a shift gate, and a shift register. The electric charge stored in the photoelectric conversion element is transferred to the shift register by opening the shift gate, and the electric charge is output while being sequentially moved by the shift register. The electric charge of each photoelectric conversion element corresponds to the value of each pixel constituting the image data read by the reading operation of the reading unit 31.

The opening of the shift gate (transfer of electric charge) is performed in response to a control signal from a control application specific integrated circuit (ASIC) 11 to be described later. The electric charge transferred to the shift register is converted to analog data and transmitted from an output unit at the end of the shift register to an analog front end (AFE) 20 of the controller 10.

The controller 10 includes, for example, a CPU that performs main control, a ROM that stores programs and the like, a RAM that temporarily stores data and the like as a main memory, an ASIC that is designed to exclusively perform various types of processing, and other electronic circuit components. The controller 10 may be a system-on-a-chip (SoC) controller. The controller 10 includes, for example, the control ASIC 11, the AFE 20, an image processing unit 21, a storage unit 22, and an output unit 23. The control ASIC 11 includes a motor controller 12, a reading controller 13, a light source drive unit 14, and a shading unit 15.

The motor controller 12 causes the transport unit 30 to transport a document, for example, by controlling a motor (not shown) of the transport unit 30 by PID control. The reading controller 13 controls reading by the reading unit 31. Specifically, the reading controller 13 transmits a trigger as the control signal to the reading unit 31, and controls transfer of the electric charge stored in the photoelectric conversion element to the shift register. Further, the reading controller 13 controls the output of the electric charge stored in the shift register of the reading unit 31 to the AFE 20. The light source drive unit 14 controls lighting of the light source 32 by controlling energization of the light source 32. The light source drive unit 14 can control lighting of the light source 32 in accordance with the reading operation of the reading unit 31.

The AFE 20 converts analog data output from the reading unit 31 into digital data. The image processing unit 21 performs various corrections such as shading correction and predetermined conversion on the digital data output from the AFE 20 to output them. However, sharing of roles between the AFE 20 and the image processing unit 21 need not be understood in a limited manner as described above. The AFE 20 and the image processing unit 21 may be collectively referred to as an AFE, or conversely, the AFE 20 and the image processing unit 21 may be collectively referred to as an image processing unit. The storage unit 22 also functions as a buffer for temporarily storing digital data during or after processing by the image processing unit 21. The storage unit 22 transmits the temporarily stored digital data to the output unit 23 in a first-in first-out (FIFO) format.

The output unit 23 transmits the digital data input from the storage unit 22 to an external information processing apparatus, for example, a host such as a personal computer (not shown). The function of the output unit 23 is implemented by, for example, an interface that performs a network connection or a Universal Serial Bus (USB) connection. When the image reading apparatus 100 is a multifunction machine as described above, the output unit 23 may output data to a printer unit that is capable of performing printing based on image data that the image reading apparatus 100 has.

As shown in FIG. 2, the image reading apparatus 100 includes a main body 40 and a lid 41 that covers a predetermined surface of the main body 40. The lid 41 is also referred to as a cover. The lid 41 may be openable and closable relative to the main body 40. A document transport path 48 is secured between the main body 40 and the lid 41. That is, the transport unit 30 takes in the document into the housing of the image reading apparatus 100 from a supply port 42 upstream of the transport path 48. The transport unit 30 transports a document taken in from the supply port 42 in the transport path 48 by rotating rollers 44a, 44b, 45a, 45b, and the like, and discharges the document from a discharge port 43 downstream of the transport path 48 to the outside. Although the illustration is omitted, a tray for placing a document before reading is disposed in the vicinity of the supply port 42, or a tray for accumulating the document after reading is disposed in the vicinity of the discharge port 43.

The predetermined surface of the main body 40, that is, part of the surface facing the lid 41, is constituted by a transparent member 46. While the transparent member 46 is often made of glass, it may be a transparent material other than glass. As shown in FIG. 2, the light source 32 and the reading unit 31 are housed inside the main body 40. Although omitted in FIG. 2, the controller 10 is also housed in the main body 40. A background plate 47 is disposed on a lid 40 at a position facing the transparent member 46. The background plate 47 is, for example, a white plate member.

When the document transported on the transport path 48 passes a position corresponding to the transparent member 46, the document is irradiated with the light source 32 emits light, and the reflected light from the document enters the reading unit 31 through the transparent member 46. As is known, the reading unit 31 appropriately includes an optical system such as a lens or a mirror in addition to the image sensor, and light incident on the reading unit 31 through the transparent member 46 is received by the image sensor via the optical system. In a state where no document is present between the transparent member 46 and the background plate 47, the background plate 47 is irradiated by the light source 32, and the reflected light from the background plate 47 enters the reading unit 31.

In FIG. 2, the pair of rollers 44a and 44b facing each other across the transport path 48 and the pair of rollers 45a and 45b facing each other across the transport path 48 are illustrated as part of the rollers constituting the transport unit 30. The roller 44a is disposed on the lid 41 side, and the roller 44b is disposed on the main body 40 side. Further, the roller 45a is disposed on the lid 41 side, and the roller 45b is disposed on the main body 40 side. The rollers 44a and 44b are located upstream of the background plate 47. The rollers 44a and 44b may be referred to as a paper feed roller or the like. The rollers 45a and 45b are located downstream of the background plate 47. The rollers 45a and 45b may be referred to as a discharge roller or the like.

Figure 3:
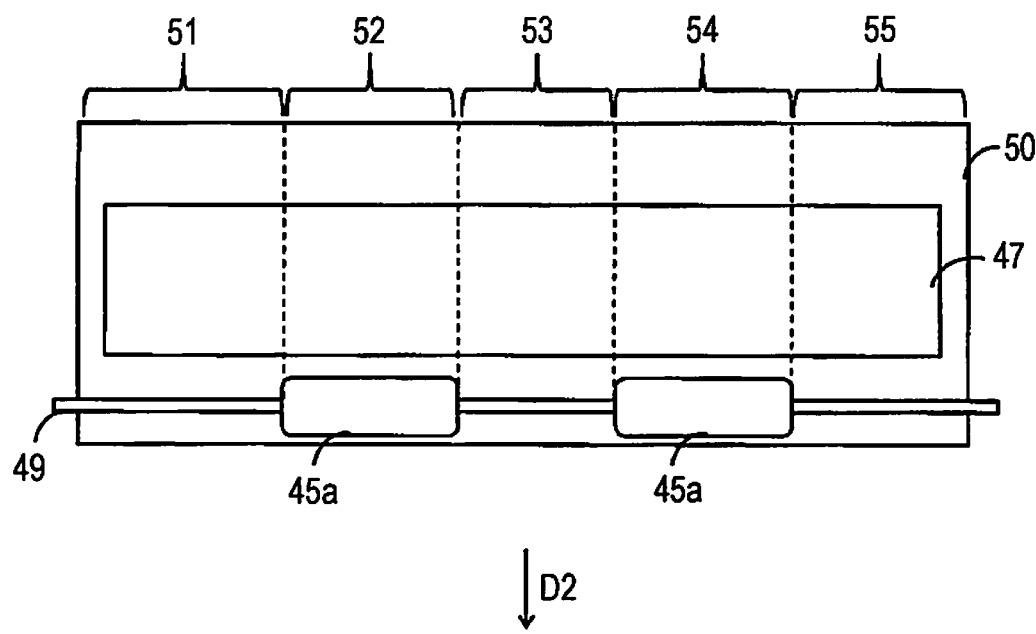
FIG. 3 is a diagram showing a reading region including a first region and a second region.

A partial range of the transport path 48 including the background plate 47 is referred to as a reading region 50. FIG. 3 shows the reading region 50 when viewing the lid 41 from the main body 40. The reading region 50 shown in FIG. 3 is part of the surface of the lid 41 facing the main body 40. The direction D1 is the main scanning direction of the reading unit 31, that is, the image sensor of the reading unit 31. Further, the direction D2 indicates the direction from the upstream to the downstream of the transport path 48. The reading region 50 includes the background plate 47. Further, the reading region 50 includes the discharge roller 45a on the downstream side. As illustrated in FIG. 2, the discharge roller 45a is paired with the discharge roller 45b on the main body 40 side with the transport path 48 interposed therebetween. In the example of FIG. 3, a plurality of (for example, two) discharge rollers 45a is disposed at a predetermined interval along the main scanning direction D1. The reference sign 49 indicates a rotation shaft 49 of the discharge roller 45a. That is, in the example of FIGS. 2 and 3, two pairs of discharge rollers 45a and 45b are disposed at the predetermined interval along the main scanning direction D1. Naturally, two pairs of paper feed rollers 44a and 44b may also be disposed at a predetermined interval along the main scanning direction D1.

Due to the structure of the image reading apparatus 100, external light enters the transport path 48 from the supply port 42 and the discharge port 43. Although depending on the structure of the image reading apparatus 100, because external light is reflected on the document after reading that has been deposited on the tray provided at the discharge port 43, the distance from the discharge port 43 to the background plate 47 is shorter than the distance from the supply port 42 to the background plate 47 or the like, in particular, external light entering from the discharge port 43 easily reaches the vicinity of the background plate 47.

The paper feed rollers 44a and 44b and the discharge rollers 45a and 45b partially enter the transport path 48 in order to nip and rotate the document. Accordingly, external light entering the transport path 48 from the discharge port 43 is partially shielded by the discharge rollers 45a and 45b. The positions and sizes of the discharge roller 45a and the discharge roller 45b constituting the pair are assumed to be the same in the main scanning direction D1. In FIG. 3, the reading region 50 is shown divided into a plurality of regions 51, 52, 53, 54, and 55. The regions 51, 52, 53, 54, and 55 are arranged in the main scanning direction D1. Among these, the regions 52 and 54 correspond to the positions of the respective pairs of discharge rollers 45a and 45b in the main scanning direction D1.

Since the external light entering the transport path 48 from the discharge port 43 is shielded by the discharge rollers 45a and 45b, the regions 52 and 54 receive no or almost no entry of the external light. On the other hand, the regions 51, 53, and 55 receive much entry of the external light, compared with the regions 52 and 54, because the external light shielding effect by the discharge rollers 45a and 45b does not work for the regions 51, 53, and 55. Therefore, according to the example of FIG. 3, in the reading region 50, the regions 52 and 54 correspond to the "first region" in which the member that suppresses the entry of external light is disposed, and the regions 51, 53, and 55 corresponds to the "second region", which is other than the first region. The discharge rollers 45a and 45b correspond to an example of a member that suppresses the entry of the external light.

2. Reading Control Process:

A reading control process performed by the image reading apparatus 100 will be described in the configuration described above. The reading control process includes a shading correction method and an external light determination method in part of the process. According to the shading correction method, the image reading apparatus 100 performs a shading measurement before scanning of a document (hereinafter, the scan), determines the intensity of external light in the second region based on the reading value in the reading region 50 wherein the reading value is obtained by the shading measurement, and depending on the result of the determination, performs control to switch the shading correction to be performed in the scan.

Figure 4:
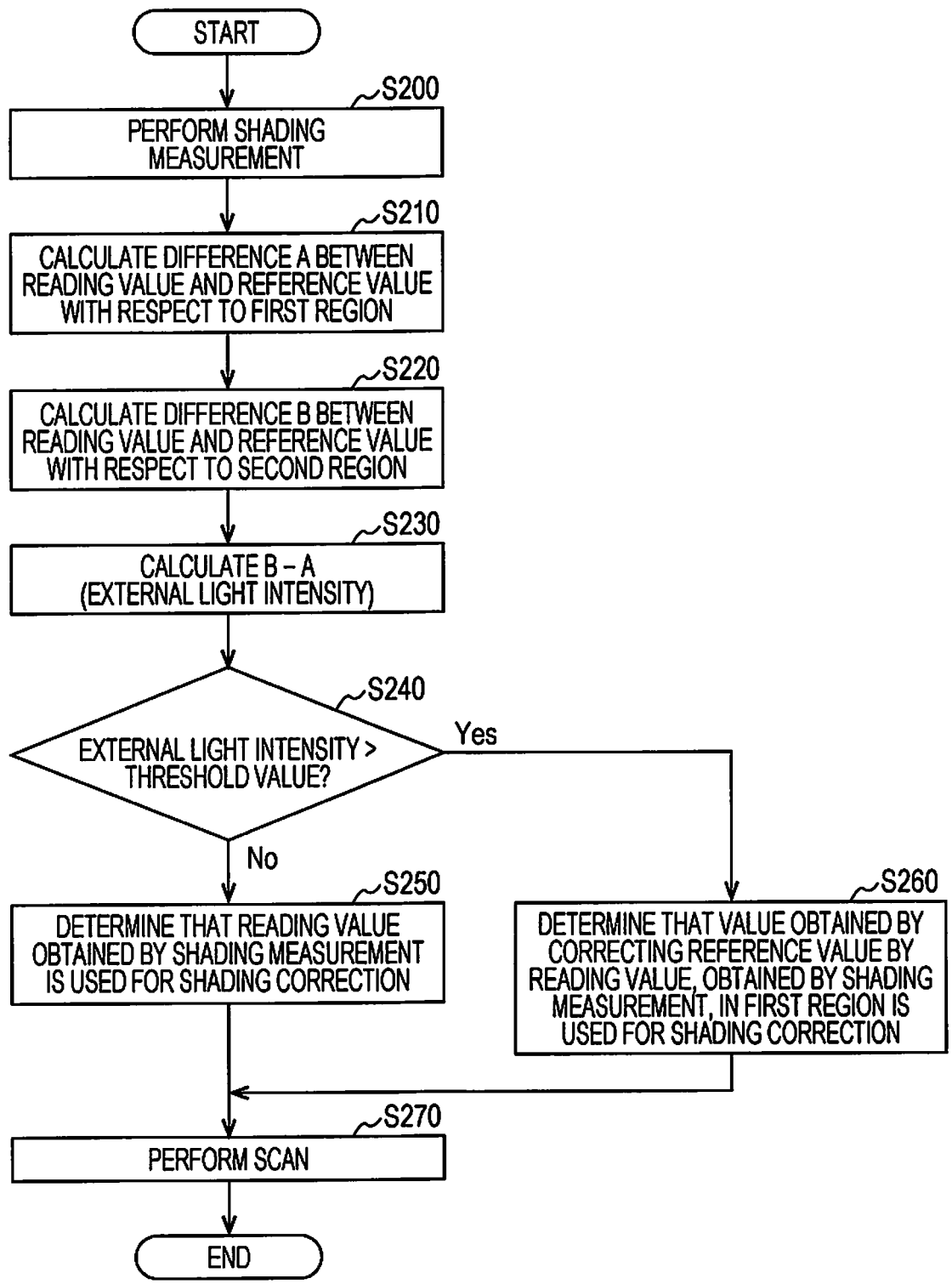
FIG. 4 is a flowchart showing a reading control process.

FIG. 4 is a flowchart showing the reading control process performed by the controller 10. The reading control process is started when the user operates the operation panel 33 and instructs the image reading apparatus 100 to start scanning a document.

In step S200, the controller 10 performs a shading measurement. The shading measurement is a process for acquiring the black level and the white level of the reading value by the current reading unit 31. The controller 10 controls the light source 32 and the reading unit 31 to perform light-on reading of the reading region 50 and light-off reading of the reading region 50. That is, the controller 10 causes the reading unit 31 to read the reading region 50 in a state in which the light source 32 is turned on, and causes the reading unit 31 to read the reading region 50 in a state in which the light source 32 is turned off. The reading of the reading region 50 by the reading unit 31 is substantially the reading of the background plate 47. Naturally, in the shading measurement, the transport of the document by the transport unit 30 is not performed. The image data read by the light-on reading of the reading region 50 is referred to as a "white level reading value", and the image data read by the light-off reading of the reading region 50 is referred to as a "black level reading value".

Here, the shading correction will be briefly described. The white level reading value and the black level reading value may fluctuate depending on the output characteristics of the reading unit 31. For example, the output characteristics of the reading unit 31 fluctuate due to a noise such as the dark current, a manufacturing error for each sensor chip or each photoelectric conversion element, a change with time, an ambient temperature, and the like, and the white level reading value and the black level reading value vary depending on this fluctuation. In addition, the white level reading value and the black level reading value vary due to the influence of the external light. In the shading correction, when the output from the reading unit 31 represents the black level set for the shading correction, the reading value is converted to a minimum value of the digital output, and when the output from the reading unit 31 represents the white level set for the shading correction, the reading value is converted to a maximum value of the digital output. The minimum value of the digital output means that, for example, the gradation value=0 when digital data is expressed by 256 gradations of 0 to 255. The maximum value of the digital output means that the gradation value=255. By performing the shading correction, for example, the variation in the range of the black level to the white level for each photoelectric conversion element, that is, for each pixel is made to be uniform.

However, since the shading measurement is performed in a state in which the document is not present in the reading region 50, the external light entering from the outside such as the discharge port 43 is read by the reading unit 31. That is, the shading measurement is more or less affected by the external light. On the other hand, when the scan is performed, since the document is present in the transport path 48 including the reading region 50, the external light entering from the outside is shielded by the document itself, and the external light is hardly read by the reading unit 31. Therefore, when the reading value obtained by the shading measurement is largely affected by the external light, use of such a reading value for the shading correction causes deterioration in the scanning quality of the document. In the present embodiment, the intensity of the external light in the second region is determined in order to avoid such deterioration in the scan quality, and the shading correction to be performed in the scan is switched according to the determination result.

In step S210, the shading unit 15 of the controller 10 calculates, with respect to the first region, a difference A between the reading value obtained by the shading measurement and the reference value stored in advance in a predetermined memory. The predetermined memory is, for example, a memory in the controller 10 wherein the memory may or may not be in the storage unit 22. The reference value is a reference value of the white level reading value and a reference value of the black level reading value. The reference value of the white level reading value is referred to as a "white level reference value", and the reference value of the black level reading value is referred to as a "black level reference value".

For example, before the image reading apparatus 100 is shipped to the market, the reference value is calculated by a process by the vendor of the image reading apparatus 100 and stored in the predetermined memory. Specifically, the white level reference value and the black level reference value are the white level reading value and the black level reading value read by the shading measurement under an ideal situation where there is no entry of external light into the reading region 50 of the image reading apparatus 100. Alternatively, the controller 10 may use, as a reference value, the white level and the black level set for the shading correction in step S250 or step S260 in the latest past reading control process (FIG. 4) for the reading control process (FIG. 4) currently being performed.

Figure 5:
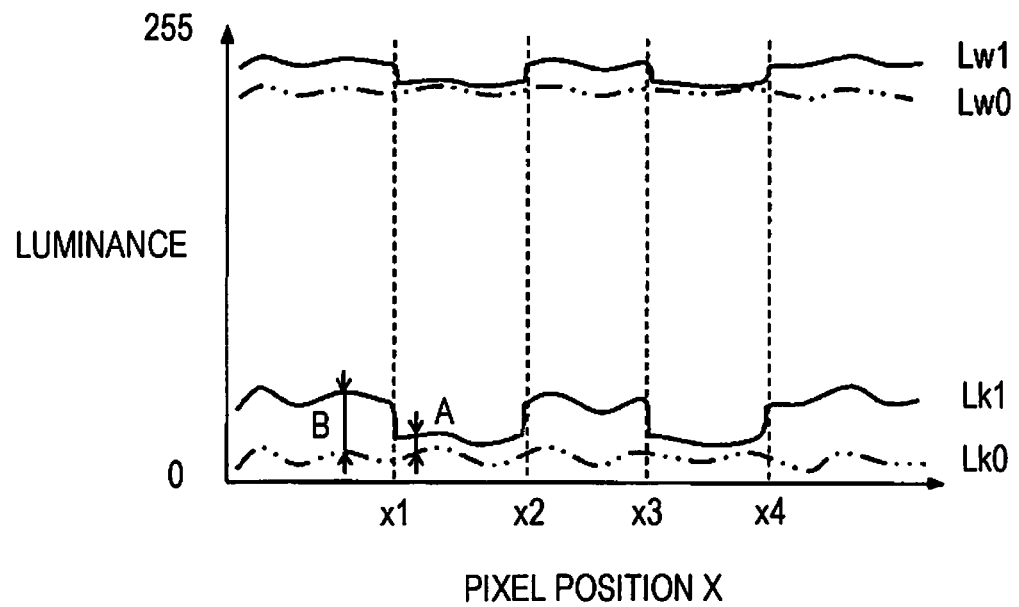
FIG. 5 is a diagram showing a reading value and the like obtained by a shading measurement in step S200.

FIG. 5 shows a reading value and the like obtained by the shading measurement in step S200. In FIG. 5, the horizontal axis represents the pixel position X, and the vertical axis represents the luminance. The luminance is represented, for example, by gradation values in the 256 gradation range of 0 to 255. The pixel position X is a position of each pixel constituting image data, and corresponds to a position of each photoelectric conversion element, in the main scanning direction D1, of the image sensor that the reading unit 31 has. The same applies to FIG. 6 described later in that the horizontal axis represents the pixel position X and the vertical axis represents the luminance as a representation of the figure.

The solid line indicated by the reference sign Lw1 in FIG. 5 represents the white level reading value Lw1 read by the shading measurement in step S200. The solid line indicated by the reference sign Lk1 in FIG. 5 represents the black level reading value Lk1 read by the shading measurement in step S200. The two-dot chain line indicated by the reference sign Lw0 in FIG. 5 represents the white level reference value Lw0, and the two-dot chain line indicated by the reference sign Lk0 in FIG. 5 represents the black level reference value Lk0. The white level reading value Lw1 and the black level reading value Lk1 are both acquired by the image processing unit 21 that receives the output from the AFE 20.

The range of the pixel position X=x1 to x2 and the range of the pixel position X=x3 to x4 correspond to the range of the first region in the main scanning direction D1 in the reading region 50. The ranges other than the ranges of the pixel positions X=x1 to x2 and x3 to x4 correspond to the range of the second region in the main scanning direction D1 in the reading region 50. The pixel positions X=x1, x2, x3, x4 may belong to the first region or may belong to the second region. Due to the structure of the image reading apparatus 100, the positions of the discharge rollers 45a and 45b are fixed. As a result, the controller 10 has the existence range of the discharge rollers 45a and 45b in the main scanning direction D1, that is, the range of the first region, as information of the pixel position X in advance.

In step S210, the shading unit 15 calculates the difference A between the black level reading value Lk1 and the black level reference value Lk0 at each pixel position X of x1 to x2 and x3 to x4 corresponding to the first region. However, such a difference A is dispersed for each pixel position X in the first region. Therefore, the shading unit 15 calculates the average value or the median value of the differences A as the difference A between the black level reading value Lk1 and the black level reference value Lk0 for the first region. Unless otherwise stated below, the difference A indicates the average value of the differences between the black level reading value Lk1 for the first region and the black level reference value Lk0.

The difference A can be expressed as the amount of fluctuations from the reference value with respect to the reading value obtained by the shading measurement due to the fluctuation factor excluding the influence of external light among the fluctuation factors that cause the output characteristics of the reading unit 31 to fluctuate. The fluctuation factor excluding the influence of external light represents various factors such as a noise such as the dark current as described above, a manufacturing error for each sensor chip or each photoelectric conversion element, a change with time, an ambient temperature and the like.

In step S220, the shading unit 15 calculates, with respect to the second region, the difference B between the reading value obtained by the shading measurement and the reference value. Specifically, the shading unit 15 calculates the difference B between the black level reading value Lk1 and the black level reference value Lk0 for each pixel position X corresponding to the second region. Such a difference B can be expressed as the amount of fluctuations from the reference value with respect to the reading value obtained by the shading measurement due to the fluctuation factor including the influence of the external light.

In step S230, the shading unit 15 sets, as the intensity of the external light in the second region (hereinafter, external light intensity), the difference obtained by subtracting the difference A calculated in step S210 from the difference B. However, the difference B varies for each pixel position X in the second region. As a result, the shading unit 15 subtracts the difference A from the difference B at each pixel position X in the second region, and calculates, as the external light intensity, the average value or the median value of the difference B–difference A which is obtained for each pixel position X in the second region. Unless otherwise stated below, the external light intensity refers to the average value of the difference B–difference A which is obtained for each pixel position X in the second region. The influence of the external light on the shading measurement for the black level reading value Lk1 appears more strongly than that for the white level reading value Lw1, so that the comparison between the white level reference value Lw0 and the white level reading value Lw1 for calculating the external light intensity is not performed.

In step S240, the shading unit 15 determines whether the external light intensity calculated in step S230 exceeds a predetermined threshold value stored in advance. The threshold value is optimized to determine whether the influence of external light on the shading measurement is large. The shading unit 15 determines "Yes" when the external light intensity exceeds the threshold value and the process proceeds to step S260. The shading unit 15 determines "No"

when the external light intensity does not exceed the threshold value and the process proceeds to the step S250.

In step S250, the shading unit 15 determines that the white level reading value Lw1 and the black level reading value Lk1 obtained by the shading measurement in step S200 are used for the shading correction. That is, it is determined that the measured value in the reading region 50 wherein the measured value is obtained by the latest shading measurement is used for the shading correction. Although a state in which there is a large difference between the luminance corresponding to the first region and the luminance corresponding to the second region for each of the white level reading value Lw1 and the black level reading value Lk1 is shown as an easy-to-understand example in FIG. 5, the determination of "No" in step S240 means that in fact, there is no such difference. That is, the influence of the external light on the shading measurement is as small as negligible. In step S250, the shading unit 15 sets the white level reading value Lw1 and the black level reading value Lk1 at each pixel position X obtained by the shading measurement in step S200 as a white level and a black level for the shading correction at each pixel position X with respect to the image processing unit 21.

On the other hand, in step S260, the shading unit 15 determines that a value obtained by correcting the white level reference value Lw0 and the black level reference value Lk0 by the reading value corresponding to the first region among the white level reading values Lw1 and the black level reading values Lk1 obtained by the shading measurement in step S200 is used for the shading correction. It can be said that Step S260 is substantially a process of determining that the reading value corresponding to the first region among the white level reading values Lw1 and the black level reading values Lk1 obtained by the shading measurement in step S200 is used for the shading correction.

Figure 6:
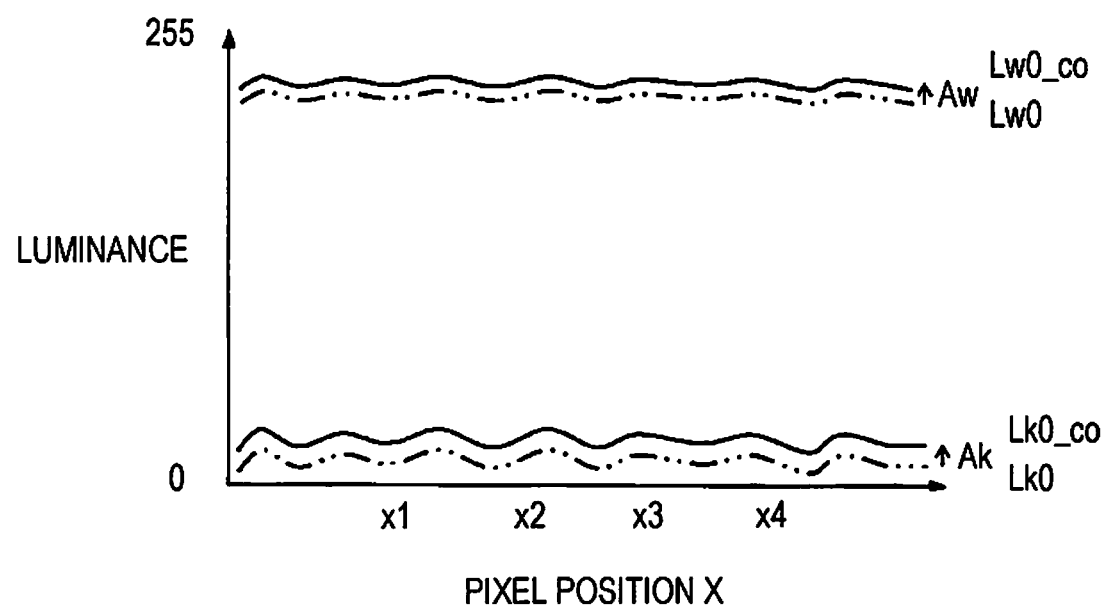
FIG. 6 is a diagram showing a reference value and the like corrected in step S260.

FIG. 6 shows the reference value and the like corrected in step S260. In FIG. 6, as in FIG. 5, the white level reference value Lw0 and the black level reference value Lk0 are indicated by two-dot chain lines. The solid line indicated by the reference sign Lw0_co in FIG. 6 represents the white level reference value Lw0_co after correction in step S260. Further, the solid line indicated by the reference sign Lk0_co in FIG. 6 represents the black level reference value Lk0_co after correction in step S260.

The difference Ak shown in FIG. 6 is the difference A calculated in step S210. The shading unit 15 corrects the black level reference value Lk0 by the difference Ak. Specifically, the shading unit 15 compares the average value of the black level reading values Lk1 corresponding to the first region with the average value of the black level reference values Lk0 corresponding to the first region. When the average value of black level reading values Lk1 corresponding to the first region is greater than the average value of black level reference values Lk0 corresponding to the first region, the black level reference value Lk0_co after correction is used by uniformly adding the difference Ak to the black level reference value Lk0 at each pixel position X. On the other hand, when the average value of the black level reading values Lk1 corresponding to the first region is less than the average value of the black level reference values Lk0 corresponding to the first region, the black level reference value Lk0_co after correction is used by uniformly subtracting the difference Ak from the black level reference value Lk0 at each pixel position X.

The difference Aw shown in FIG. 6 is the average value of the difference between the white level reading value Lw1 and the white level reference value Lw0 at each pixel positions X corresponding to the first region. In the above description, the shading unit 15 calculates the difference A, that is, the difference Ak, in step S210. The difference Aw may be calculated in addition to the difference A (difference Ak) at the timing of step S210. Alternatively, the shading unit 15 may calculate the difference Aw after the determination in step S240 is "Yes", that is, at the timing of step S260. The shading unit 15 corrects the white level reference value Lw0 by the difference Aw. Specifically, the shading unit 15 compares the average value of the white level reading values Lw1 corresponding to the first region with the average value of the white level reference values Lw0 corresponding to the first region. When the average value of the white level reading values Lw1 corresponding to the first region is greater than the average value of the white level reference values Lw0 corresponding to the first region, the white level reference value Lw0_co after correction is used by uniformly adding the difference Aw to the white level reference value Lw0 at each pixel position X. On the other hand, when the average value of the white level reading values Lw1 corresponding to the first region is less than the average value of the white level reference values Lw0 corresponding to the first region, the white level reference value Lw0_co after correction is used by uniformly subtracting the difference Aw from the white level reference value Lw0 at each pixel position X.

In FIG. 6, an example is shown in which the black level reference value Lk0_co after correction is generated by adding the difference Ak to the black level reference value Lk0, and an example is shown in which the white level reference value Lw0_co after correction is generated by adding the difference Aw to the white level reference value Lw0. In step S260, the shading unit 15 sets the white level reference value Lw0_co after correction and the black level reference value Lk0_co after correction at each pixel position X as a white level and a black level for the shading correction at each pixel position X with respect to the image processing unit 21. Each of the white level reference value Lw0_co after correction and the black level reference value Lk0_co after correction is a value obtained by correcting the reference value by the amount of fluctuations from the reference value with respect to the reading value obtained by the shading measurement due to the fluctuation factor excluding the influence of the external light. Therefore, it can be said that the white level reference value Lw0_co after correction and the black level reference value Lk0_co after correction appropriately represent the current output characteristics of the reading unit 31 reflecting the fluctuation factor excluding the influence of external light.

In step S270, the controller 10 performs the scan. That is, the controller 10 controls the transport unit 30 so that the transport unit 30 performs transport of the document, and further controls the light source 32 and the reading unit 31 so that the reading unit 31 reads the document transported to the reading region 50 by the transport unit 30. The image data read by the reading unit 31 by the scan is an object of the shading correction by the image processing unit 21. At this time, the image processing unit 21 performs the shading correction using the white level and the black level at each set pixel position X. Naturally, when performing step S270 after step S250, the shading correction using the white level and black level set in step S250 is performed, and when performing step S270 after step S260, the shading correction using the white level and the black level set in step S260 is performed.

As described above, the shading correction to be performed along with the scan in step S270 after step S260 corresponds to the first shading correction using the reading value in the first region among the reading values in the reading region 50 wherein the reading values are obtained by the shading measurement. On the other hand, the shading correction to be performed along with the scan in step S270 after step S250 is the second shading correction using the reading values in the first region and the second region among the reading values in the reading region 50 wherein the reading values are obtained by the shading measurement.

3. Summary:

Thus, according to the present embodiment, the image reading apparatus 100 includes the reading unit 31 that performs reading according to the amount of light received, the first region in which a member that suppresses the entry of external light is disposed, the reading region 50 in which the second region other than the first region is arranged in the main scanning direction D1 of the reading unit 31, and the controller 10 that controls the reading unit 31. The controller 10 calculates the external light intensity in the second region based on the reading value in the reading region 50 by the reading unit 31, and determines whether the external light intensity exceeds a threshold value. When the external light intensity exceeds the threshold value, the first shading correction is performed on the reading value by the reading unit 31 of the document transported to the reading region 50, and when the external light intensity does not exceed the threshold value, the second shading correction different from the first shading correction is performed on the reading value of the document.

According to the above configuration, the image reading apparatus 100 calculates the external light intensity in the second region based on the reading value in the reading region 50 according to the feature of the structure in which the first region in which a member that suppresses the entry of external light is disposed and the second region other than the first region are arranged in the main scanning direction D1 in the reading region 50. This makes it possible to appropriately determine the intensity of the external light entering the reading region 50. Further, it is possible to perform the appropriate shading correction by switching the shading correction to be performed on the reading value of the document in accordance with the determination result of the external light intensity.

Further, according to the present embodiment, the members that suppress the entry of the external light are the discharge rollers (discharge rollers 45*a* and 45*b*) provided on the discharge side of the document. According to the above configuration, the image reading apparatus 100 can properly determine the intensity of the external light entering the reading region 50 according to the specific structure in which part of the external light entering the reading region 50 from the discharge side of the document is shielded by the discharge rollers 45*a* and 45*b*.

However, the member which suppresses the entry of the external light is not limited to the discharge rollers 45*a* and 45*b*. Depending on the structure of the image reading apparatus 100, the paper feed rollers 44*a* and 44*b* may be regarded as the above member to define the first region and the second region. The above member may be a antistatic brush provided in the middle of the transport path 48 or in the vicinity of the discharge port 43 to discharge static electricity charged on the document, or a pressing member or the like provided in the vicinity of the discharge port 43 to press the document to be discharged.

Further, according to the present embodiment, the controller 10 calculates the external light intensity based on the difference between the reading value in the second region and the reading value in the first region among the reading values in the reading region 50. More specifically, the controller 10 regards, as the external light intensity, the difference obtained by subtracting the difference between the reference value and the reading value in the first region from the difference between the reference value stored in advance for the reading values in the reading region 50 and the reading value in the second region. According to the above configuration, it is possible to appropriately calculates, as the external light intensity, the amount of fluctuations ascribable to the influence of the external light among various fluctuation factors that fluctuate the output characteristics of the reading unit 31 and that are included in the reading value in the reading region 50.

Note that, in the process of steps S210 to S230, instead of the process described above the controller 10 may calculate the difference between the average value of the reading values in the second region among the reading values in the reading region 50 wherein the reading values are obtained by the shading measurement and the average value of the reading values in the first region among the reading values in the reading region 50 wherein the reading values are obtained by the shading measurement to regard the calculated difference as the external light intensity. That is, it is also possible to calculate the external light intensity without using the reference value.

Further, according to the present embodiment, when the external light intensity exceeds the threshold value, the controller 10 performs the first shading correction using the reading value in the first region among the reading values in the reading region 50, and when the external light intensity does not exceed the threshold value, the controller 10 performs the second shading correction using the reading values in the first region and the second region among the reading values in the reading region 50. According to the above configuration, it is possible to perform the appropriate shading correction according to the current output characteristics of the reading unit 31 reflecting the fluctuation factor excluding the influence of the external light in either of a case in which the external light intensity exceeds the threshold value and a case in which the external light intensity does not exceed the threshold value.

In addition, according to the flowchart of FIG. 4, step S200 corresponds to the reading process of reading, by the reading unit, a reading region in which the first region in which the member that suppresses the entry of external light is disposed and the second region other than the first region are arranged in the main scanning direction of the reading unit that performs reading according to the amount of light received. Further, steps S210 to S230 correspond to the external light calculating process of calculating the external light intensity in the second region based on the reading value in the reading region by the reading unit. Further, step S240 corresponds to the determination process of determining whether the external light intensity exceeds the threshold value. Further, the branching in step S240 and steps S250 and S260 correspond to the switching process of switching the shading correction to be performed, by the reading unit, on the reading value of the document transported to the reading region according to the result of the determination.

In addition, although the transport path 48 goes diagonally downward from diagonally upward in the example of FIG. 2, the transport path 48 may go in the horizontal direction. Alternatively, the transport path 48 may be curved.

The image reading apparatus 100 may be a scanner capable of simultaneously reading one side and the other side of a document. That is, the configuration is assumed to include a transparent member, a light source, and a reading unit which are disposed to read one side of the document, a transparent member, a light source, and a reading unit which are disposed to read the other side of the document, a background plate facing the transparent member which is disposed to read one side of the document with a transport path of the document interposed therebetween, and a background plate facing the transparent member which is disposed to read the other side of the document with the transport path of the document interposed therebetween. The configuration may be such that the external light intensity of the respective second regions is determined with respect to the two reading regions, each including these two background plates, and the shading correction to be performed in the scan of the one side and the shading correction to be performed in the scan of the other side are switched according to respective determination results of the external light intensity.

What is claimed is:

1. An image reading apparatus comprising:
an image sensor performing reading according to an amount of light received;
a reading region in which a first region in which a member that suppresses entry of external light is disposed and a second region other than the first region are arranged relative to each other in a main scanning direction of the image sensor, with the main scanning direction being a direction that intersects a transport direction along which a document is transported relative to the image sensor; and
a controller controlling the image sensor, wherein
the controller calculates intensity of external light in the second region based on a reading value in the reading region, the reading value being obtained by the image sensor, determines whether the intensity of the external light exceeds a threshold value, performs a first shading correction on a reading value, obtained by the image sensor, of the document that is transported to the reading region along the transport direction when the intensity of the external light exceeds the threshold value, and performs a second shading correction different from the first shading correction on the reading value of the document when the intensity of the external light does not exceed the threshold value.

2. An image reading apparatus comprising:
an image sensor performing reading according to an amount of light received;
a reading region in which a first region in which a member that suppresses entry of external light is disposed and a second region other than the first region are arranged in a main scanning direction of the image sensor; and
a controller controlling the image sensor, wherein
the controller calculates intensity of external light in the second region based on a reading value in the reading region, the reading value being obtained by the image sensor, determines whether the intensity of the external light exceeds a threshold value, performs a first shading correction on a reading value, obtained by the image sensor, of a document transported to the reading region when the intensity of the external light exceeds the threshold value, and performs a second shading correction different from the first shading correction on the reading value of the document when the intensity of the external light does not exceed the threshold value, and
the member is a discharge roller provided on a discharge side of the document.

3. An image reading apparatus comprising:
an image sensor performing reading according to an amount of light received;
a reading region in which a first region in which a member that suppresses entry of external light is disposed and a second region other than the first region are arranged in a main scanning direction of the image sensor; and
a controller controlling the image sensor, wherein
the controller calculates intensity of external light in the second region based on a reading value in the reading region, the reading value being obtained by the image sensor, determines whether the intensity of the external light exceeds a threshold value, performs a first shading correction on a reading value, obtained by the image sensor, of a document transported to the reading region when the intensity of the external light exceeds the threshold value, and performs a second shading correction different from the first shading correction on the reading value of the document when the intensity of the external light does not exceed the threshold value, and
the controller calculates the intensity of the external light based on a difference between a reading value in the second region and a reading value in the first region among reading values in the reading region.

4. The image reading apparatus according to claim 3, wherein
the controller regards, as the intensity of the external light, a difference obtained by subtracting, from a difference between a reference value stored in advance for a reading value in the reading region and the reading value in the second region, a difference between the reference value and the reading value in the first region.

5. An image reading apparatus comprising:
an image sensor performing reading according to an amount of light received;
a reading region in which a first region in which a member that suppresses entry of external light is disposed and a second region other than the first region are arranged in a main scanning direction of the image sensor; and
a controller controlling the image sensor, wherein
the controller calculates intensity of external light in the second region based on a reading value in the reading region, the reading value being obtained by the image sensor, determines whether the intensity of the external light exceeds a threshold value, performs a first shading correction on a reading value, obtained by the image sensor, of a document transported to the reading region when the intensity of the external light exceeds the threshold value, and performs a second shading correction different from the first shading correction on the reading value of the document when the intensity of the external light does not exceed the threshold value, and
when the external light intensity exceeds the threshold value, the controller performs the first shading correction using a reading value in the first region among reading values in the reading region, and when the external light intensity does not exceed the threshold value, the controller performs the second shading correction using the reading value in the first region and a reading value in the second region among the reading values in the reading region.

6. A shading correction method comprising:
reading, by an image sensor performing reading according to an amount of light received, a reading region in which a first region in which a member that suppresses entry of external light is disposed and a second region other than the first region are arranged relative to each other in a main scanning direction of the image sensor, with the main scanning direction being a direction that intersects a transport direction along which a document is transported relative to the image sensor;

calculating intensity of external light in the second region based on a reading value in the reading region, the reading value being obtained by the image sensor;

determining whether the intensity of the external light exceeds a threshold value; and switching, according to a result of the determination, a shading correction to be performed on the reading value, obtained by the image sensor, of the document that is transported to the reading region along the transport direction.

\* \* \* \* \*